June 16, 1964  P. G. MEYERS  3,137,184
TOOL COOLING APPARATUS
Filed July 5, 1961  2 Sheets-Sheet 1
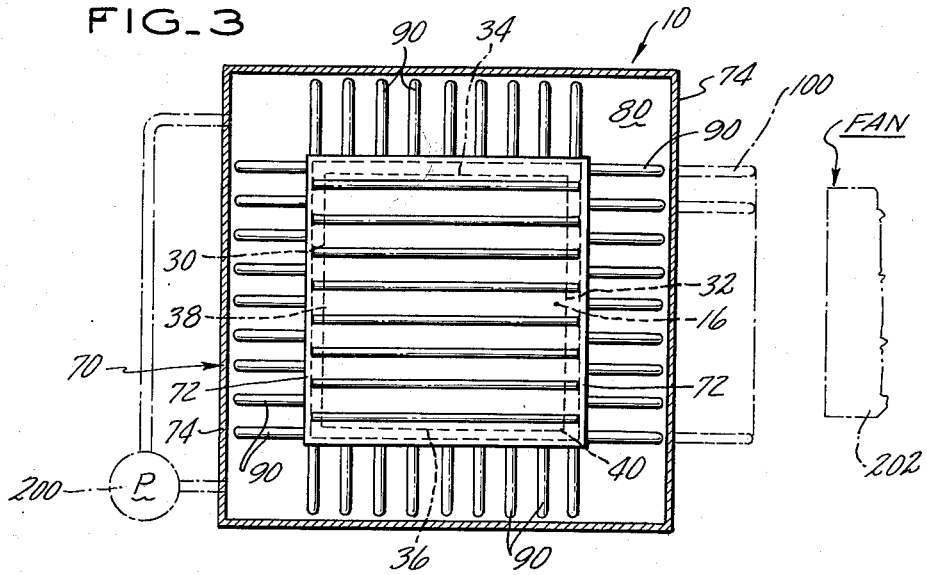
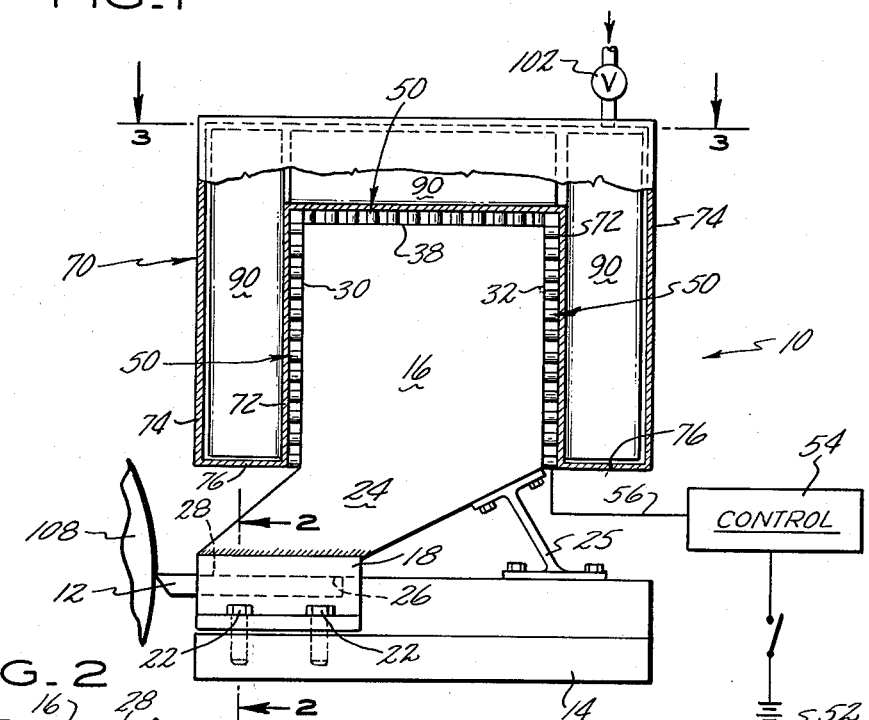
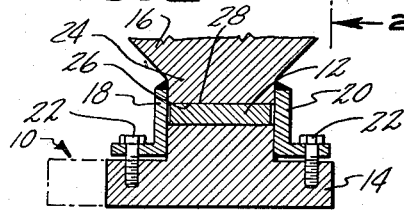
INVENTOR
PETER G. MEYERS
BY Vernon F. Hauschild
ATTORNEY

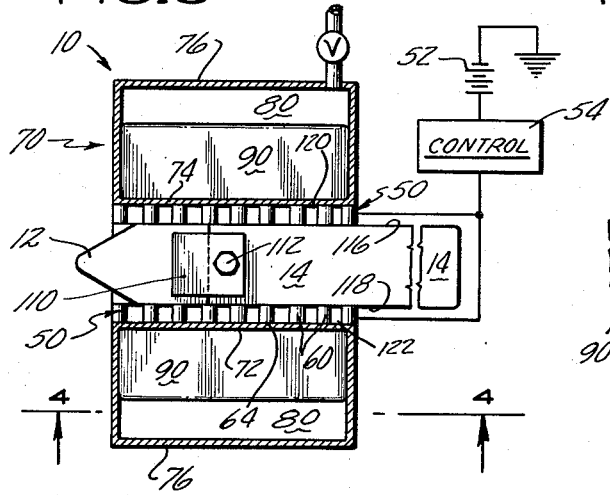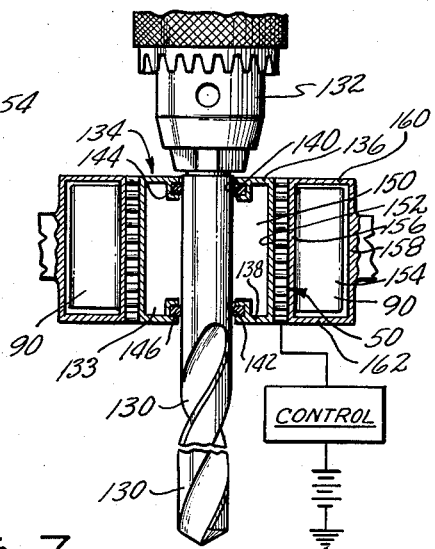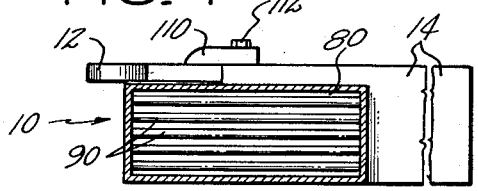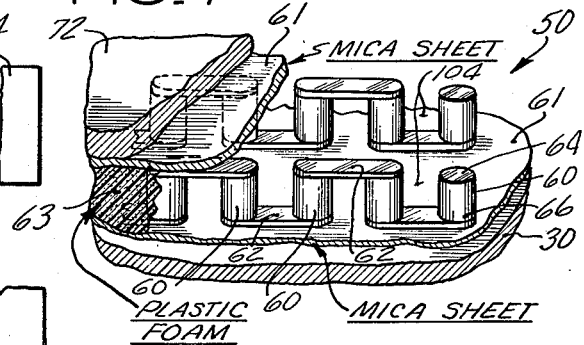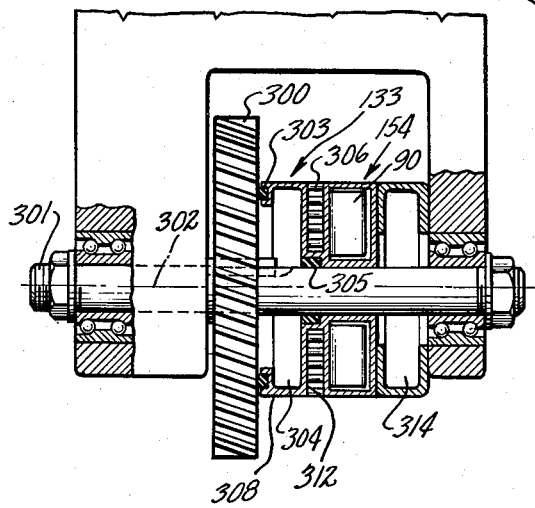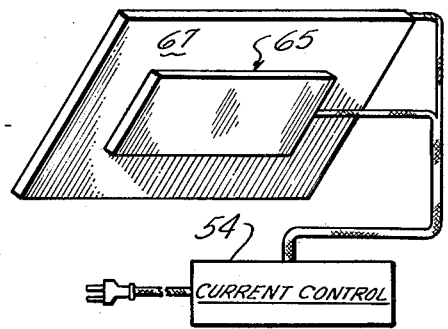

United States Patent Office 3,137,184
Patented June 16, 1964

3,137,184
TOOL COOLING APPARATUS
Peter G. Meyers, 541 Burnside Ave.,
East Hartford 8, Conn.
Filed July 5, 1961, Ser. No. 121,967
7 Claims. (Cl. 77—55)

This invention relates to the cooling of work or cutting tools of the machine tool type and more particularly to means for cooling cutting tools thermoelectrically.

It is an object of this invention to teach apparatus for cooling cutting tools of the machine tool type using thermoelectric cooling and wherein the cutting tool, the cutting tool support mechanism and the workpiece may or may not be part of the cooling apparatus and wherein the cutting tool, the cutting tool support apparatus, the workpiece, the work piece support apparatus and the cutting fluid may be cooled individually or collectively by individual or collective cooling units.

It is a further object of this invention to cool cutting tools more effectively than by presently known means to thereby increase the life of the cutting tools, allow greater cutting speeds, permit the use of higher grade cutters, and to bring about the possibility of machining materials which are not machinable by present means.

It is a further object of this invention to cool cutting tools thermoelectrically such that the cooling takes place at critical points only, thereby eliminating the wasted energy of cooling non-critical parts.

It is a further object of this invention to cool cutting tools with apparatus having no moving parts, eliminating the currently used cooling fluids which are often poisonous or precipitate allergy reaction and which require auxiliary equipment for fluid dispersions and which frequently contaminate the workpiece requiring cleaning thereof or changing the strength characteristics of the workpiece through changed internal crystal structure.

It is a further object of this invention to teach cutting tool temperature varying apparatus which is capable of either reducing the temperature of the cutting tool and the workpiece to prevent annealing of the workpiece or cooling or heating the workpiece to alter its strength, crystal orientation and machinability characteristics.

It is a further object of this invention to teach apparatus for cooling a cutting tool which is adaptable to the cooling requirements and dimension of any such tool without tool re-design.

It is still a further object of this invention to teach apparatus for cooling cutting tools which is adaptable for use on any type of machine tool, with any workpiece materials and which may be used with both stationary and moving cutting tools.

It is still a further object of this invention to teach apparatus for cooling machine tool cutting tools which is smaller in size than the conventional mechanical refrigeration system.

Other objects and advantages will be apparent from the specification and claims and from the accompanying drawings which illustrate an embodiment of the invention.

FIG. 1 is a side view of my cutting tool cooling apparatus partially broken away to illustrate the apparatus more clearly.

FIG. 2 is a view taken along line 2—2 of FIG. 1.

FIG. 3 is a view taken along line 3—3 of FIG. 1.

FIGS. 4 and 5 are a side and top view, respectively, of my cutting tool cooling apparatus in modified form wherein the cutting tool support means constitutes part of the cooling device.

FIG. 6 is a modification of my cutting tool apparatus permitting its stationary use with rotatable cutting tools such as a drill.

FIG. 7 is a showing of a typical thermoelectric module.

FIG. 8 is a showing of a plural bank or cascade of modules.

FIG. 9 is a fragmentary showing of my invention used with a wheel shaped cutting tool such as a milling cutter.

Referring to FIG. 1 we see thermoelectric cutting tool cooling apparatus 10 comprising work or cutting tool 12 which is held by cutting tool holder 14 with the cooperation of highly heat conductive member 16 which has L-shaped flanges 18 and 20 attached thereto and projecting therefrom as best shown in FIG. 2 to be attachable by any convenient means such as bolts 22 to tool holder 14. Flanges 18 and 20 are attached to member 16 by any convenient means such as welding or a mechanical attachment such as bolts (not shown). Member 16 is preferably solid and made of a highly heat conductive metal such as aluminum or copper and is of reduced cross-sectional area in the region 24 thereof which is closest to the cutting tool 12 and which, in fact, includes tool retaining surface 26 which engages tool surface 28 in surface-to-surface heat transfer engagement. The reduced size of member 16 adjacent cutting tool 12 insures maximum cooling at the critical position or region. Member 16 also includes substantial additional surfaces such as 30, 32, 34, 36 and 38 which will be used in a heat transfer fashion to be described hereinafter. For purposes of convenience and ease of manufacture heat conducting member 16 is shown to be of cubic construction at its thicker end 40 but it should be borne in mind that it might be preferable to fabricate the thicker end 40 of heat conducting member 16 to be of plural plane construction so as to approach a dome shape to provide more even heat transfer to the boundaries thereof. Further, member 16 could be a fluid heat transfer system.

Support strut 25 assists in securing thermoelectric cooler 10 and more particularly member 16 to work piece holder 14.

The thicker or greater mass end 40 of member 16 is snugly enveloped by a module 50 of couples of thermoelectic material elements which may be electrically connected to one another in either series or parallel so that as current or electricity is passed therethrough from any electrical source 52, which is preferably A.C. and which is converted to D.C. current in passing through current control 54 prior to transmittal to thermoelectric element module 50 through electrical connection 56, thereby creating a cold junction and a hot junction at the opposite ends of each of the thermoelectric elements. As best shown in FIG. 7 the thermoelectric element module 50 may be of any desired shape such as cubical or the illustrated cylinders and which are connected through bus bars such as 62 to be either in series or parallel and such that the transfer of electrical current therethrough establishes a hot junction 64 at one end thereof and a cold junction 66 at the other end thereof. Thermoelectric elements 60 may be made of any alloys possessing thermoelectric qualities but are preferably made of bismuth telluride alloys with appropriate dopings. Thermoelectric elements 60 are so oriented that the cold junction 66 is in heat transfer contact with the entire surfaces 30–38 of the thick end 40 of heat conducting member 16 and it may be preferable to provide an electric insulating layer therebetween. Preferably, electrical insulation such as a thin mica sheet 61 separates elements 60 from the contact surfaces such as 30 and 72. Lower operating temperatures may be attained by using cascades or layers of the thermoelectric elements joined electrically and with the hot junctions of the first layer 65 abutting the cold junctions of the larger second layer 67, as shown in FIG. 8.

Heat exchanger unit 70 snugly envelops thermoelectric element module 50 and includes an open ended cubical inner wall 72 which is in heat conducting electrically insulated contact with the heat junctions 64 of the thermoelectric elements 60 and which also includes a corresponding outer wall 74 joined thereto by a connecting wall 76 so as to form an enclosed and sealed cavity 80. Walls 72, 74 and 76 are made of a highly heat conductive material such as copper or aluminum such that when cavity 80 is filled with a heat absorbing and transferring fluid such as water, or a very low melting temperature metal alloy, such as Wood's metal, or an organic material such as paraffin, or a very cold liquid with a low boiling point such as liquid $CO_2$, or an inorganic compound of low melting temperature as the hydrate sodium sulfate $$(Na_2SO_4 \cdot 12H_2O)$$

or other material having a high heat of fusion, wall 72 will serve to transfer the heat from the hot junction 64 of thermoelectric elements 60 to the heat absorbing and transferring material within cavity 80 and further to the outer walls 74 and 76 thereof for either natural or forced air current cooling. Preferably a plurality of fins such as 90, which are made of a highly heat conducting material such as aluminum or copper, extend between walls 72 and 74 to assist in the heat transfer to the heat absorbing and transferring fluid and thence to walls 74 and 76. In addition, it may be desirable to place similar fins 100 along a portion of the entire outer periphery or wall 74 for further cooling.

The material used in cavity 80 should be chosen primarily for its heat absorbing qualities for my cooling unit 10 is to be self contained, however, it should also have heat conveying or transfer qualities to assist in passing heat from walls 72 and to walls 74 and 76. In this connection, if fins 90 were soldered or otherwise attached to walls 72-76, heat transfer would be aided thereby, however, for fabrication purposes the fins 90 are preferably not attached to walls 74-76.

When a very low melting temperature alloy is used in cavity 80, the alloy should be chosen such that it melts and becomes molten when the cutting tool is at its maximum desired operating temperature. Valve controlled inlet 102 is provided at the top of enclosed heat exchanger unit 70 to permit the entry of the water, alloy or organic material into cavity 80.

It has been found that vibrations created by the cutting process may tend to disturb the thermoelectric elements 60 and hence it is preferable to fill the voids 104 (FIG. 7) therebetween with an electrically inert shock absorbing material such as plastic foam.

In operation, the heat which is genrated in the cutting tool during the workpiece machining operation is transferred therefrom through member 16 to the cold junctions 66 of the thermoelectric elements 60. These cold junctions can be maintained only so long as the heat from the hot junction 64 thereof is dissipated and this hot junction heat is transferred through fins 90 to the heat absorbing and transferring material in cavity 80 from wall 72 and to wall 74 for dissipation into the air, possibly with the aid of external fins 100. In this fashion cutting tool 12 may be cooled, and it is also possible to cool cutting tool holder 6 and workpiece 108 were the surface 26 to abutt to them.

Whereas my thermoelectric cooling apparatus has been shown and described with cooling surface 26 thereof in contact with the cutting tool, it will be obvious to those skilled in the art that surface 26 could also or by way of substitution contact the chuck, tool holding piece, the workpiece, the cutting oil tubes or any related parts. For example, as shown in phantom in FIG. 2, a separate cooling unit 10 may be used to cool tool holder 14.

Further, external fins 100 will probably not be needed for normal cutting tool operation but might be useful during round-the-clock continuous operation or during overload operation.

Referring to FIGS. 4 and 5 we see an embodiment of my invention wherein workpiece holder 14 serves to convey the heat generated in cutting tool 12 to the cold junctions of the thermoelectric module 50, thereby eliminating the heat conducting member 16 used in the FIGS. 1 through 3 configuration. As shown in FIGS. 4 and 5 cutting tool 12 is attached to cutting tool holder 14 by cutting tool adjustment plate 110 which is attached in conventional fashion to tool holder 14 by bolt 112. The cutting tool holder includes opposite and flat side surfaces 116 and 118. The cold junctions 66 of thermoelectric elements 60 contact surfaces 116 and 118 as previously described to extract heat therefrom. The hot junctions 64 of thermoelectric elements 60 engage the inner wall 74 of heat exchanger unit 70 which also includes an outer wall 76 to define a cavity 80 therebetween with parts thereof on opposite sides of cutting tool holder 14. Again cavity 80 is filled with one of the aforementioned heat absorbing and transferring materials. Fins 90 extend across cavity 80 and cavity 80 includes the heat transfer material as described in connection with the FIGS. 1 through 3 configuration. Current is passed from electrical source 52 through current control 54 into portion 120 of module 50 which are "p" type thermoelectric elements and then across cutting tool holder 14 into portion 122 of module 50, which comprises "n" type thermoelectric elements and the current then returns to control 54. "p" type and "n" type refer to the mechanism of current carrying used in the particular thermoelement. "p" type refers to positive carriers or "holes," while "n" type refers to negative carriers or electrons. Modules of elements on either side of holder 14 may also each be collections of "p" and "n" types connected electrically through the tool holder 14 or by a separate electrical connection outside 14.

FIG. 6 shows an embodiment of my invention used with a rotating machine tool such as drill 130 which is driven by drill chuck 132. First heat exchanger 133 includes stationary cylindrical chamber defining wall system 134 which envelops the cylindrical shank of drill 130 and includes opposite flat walls 136 and 138 which include apertures 140 and 142 which are centrally located and in alignment so that the shank of drill 130 can pass therethrough. Walls 136 and 138 include ring seals 144 and 146 along their inner surfaces to provide a stationary seal about cylindrical drill shank 130. A cold conducting fluid such as water is provided into cavity 150 defined by wall system 134, and as the high velocity drill will be contacting substantially stationary fluid, high heat transfer capabilities are obtained. Cylindrically oriented thermoelectric element module 50 thermally contacts the curved wall 152 of wall system 134 such that the cold junctions thereof contact wall 152. A similar enclosed heat exchanger 154 having cylindrical inner wall 156 and cylindrical outer wall 158 joined by connecting walls 160 and 162 defined an enclosed annulus about cylindrical module 50. The hot junctions of the thermoelectric elements contact inner wall 156 and have heat conducted therefrom through fins 90 and the heat absorbing and transferring fluid such as water, a low melting alloy or the aforementioned organic material to outer wall 158 which may also be finned for heat dissipation to air.

Referring to FIG. 9, we see my cutting tool cooling device used with a wheel type cutting tool such as milling cutter 300, which is mounted for rotation on shaft 301 rotating about axis 302. A first heat exchanger 133, which is preferably of circular cross-section sealably engages the side of the cutter through seals 303 and 305 and is preferably rotated therewith and defines a chamber 304 therewith. A module 306 of heat exchanger elements abuts heat exchanger 133 with the cold junctions contacting side 312 and possibly side 308 also. A second heat exchanger 154 contacts the hot junctions of the module 306 and includes cavity 314. Heat exchangers 133 and 154 may be fabricated and may operate as those more fully described in connection with previously described embodiments to conduct cold from the cold junctions to the wheel 300 and to absorb and transfer heat from the hot junctions.

For more efficient heat transfer, it may be found desirable to circulate the fluid in cavity 80 by means such as pump 200 (FIG. 3) and an external air fan such as 202 (FIG. 3) may be used to create forced air circulation over heat exchanger 70. Such would reduce the size of fins 90 and unit 10 generally.

When my thermoelectric cooling unit is used to cool cutting oil a configuration as shown in FIGS. 1-3 could be used with larger flat cooling surfaces 26 on element 16, and may take advantage of both thermoelectric cooling and ambient air cooling. Also either solid rod or tube-and-fin extensions of cooling material 16 could be used thereby allowing greater heat transfer effectiveness and reduce the surface of toxic fluid adjacent the machine tool operator.

It will be obvious to those skilled in the art that the heat exchanger taught herein which defines cavity 80 operates on the heat of fusion principle. The material contained in cavity 80 is chosen to have a high heat of fusion and of such properties and quantity to absorb heat from and limit the heat of the unit.

My invention may also be used to heat the workpiece 108, cutting tool 12 and holder 14 by reversing the current flow.

It is to be understood that the invention is not limited to the specific embodiment herein illustrated and described but may be used in other ways without departure form its spirit as defined by the following claims. For example, a lathe type cutting tool has been illustrated but the tool could as well have been a die punch or grinder.

I claim:

1. Apparatus for cooling work tools of the cutting tool type comprising a highly heat conductive tool retainer member having a tool retaining surface shaped to contact the tool in surface-to-surface contact and also shaped to present at least one substantial heat transfer surface remote from said tool retaining surface, couples of thermoelectric material elements in heat conducting contact with said heat transfer surface, means electrically connecting said elements so that as electrical energy is passed therethrough a cold junction and a hot junction is formed in said elements, said elements being oriented so that said cold junctions contact said heat transfer surface.

2. Apparatus according to claim 1 and including heat exchanger means including an internally finned container contacting said hot junctions to transfer heat therefrom and containing a heat absorbing and transferring material contacting said fins within said container.

3. Apparatus according to claim 1 wherein said tool retaining member is a solid metallic part of diminished cross-sectional area at said tool retaining surface and enlarged cross-sectional area at said heat transfer surface, and including heat exchanger means including a container having spaced inner and outer walls of high thermal conductivity and with heat transfer fins therein and with said walls defining a sealed cavity, heat absorbing and transferring material filling said cavity, said inner walls being shaped to contact said hot junctions.

4. Rotary cutting tool cooling means including cylindrical chamber defining walls having aligned central holes in the flat end surfaces thereof adapted to receive a rotary cutting tool, sealing means at the inner periphery of said holes and adapted to sealably engage a rotary cutting tool, a cold conducting fluid in said chamber, a plurality of thermoelectric material elements forming a cylinder enveloping the curved position of said walls, means electrically connecting said elements so that the passage of electricity therethrough will form a cold junction and a hot junction in each of said elements, said elements being oriented so that said cold junction is in thermal contact with said walls, and heat exchanger means of cylindrical form enveloping said elements and being in contact with said hot junctions thereof.

5. Rotary cutting tool cooling apparatus including a rotatable cylindrical cutting tool, a first annular heat transfer device sleeved over said tool, a cylindrical module of thermoelectric elements with hot and cold junctions enveloping said first device with said cold junctions in heat transfer contact with said device, and a second annular heat transfer device enveloping said module and being in heat transfer contact with said hot junctions.

6. Rotary cutting tool cooling apparatus including a rotatable cylindrical cutting tool, a first stationary annular heat transfer device sleeved over said tool, a stationary cylindrical module of thermoelectric elements with hot and cold junctions in heat transfer contact with said device, and a second stationary annular heat transfer device enveloping said module and being in heat transfer contact with said hot juntions.

7. Rotary cutting tool cooling apparatus including a rotatable, wheel shaped cutting tool, a first heat transfer device sealably engaging said tool and cooperating therewith to define a chamber and including heat absorbing and transferring material in said chamber, a module of thermoelectric elements with hot and cold junctions enveloping said first device with said cold junctions in heat transfer contact with said device, and a second heat transfer device enveloping said module and being in heat transfer contact with said hot junctions.

References Cited in the file of this patent

UNITED STATES PATENTS

| | | |
|---|---|---|
| 1,921,433 | Hovgaard | Aug. 8, 1933 |
| 2,312,292 | Tyson | Feb. 23, 1943 |
| 2,533,288 | Schmitt | Dec. 12, 1950 |
| 2,922,284 | Danielson | Jan. 26, 1960 |
| 2,942,051 | Roeder | June 21, 1960 |
| 2,959,925 | Frantti et al. | Nov. 15, 1960 |
| 2,973,627 | Lackey et al. | Mar. 7, 1961 |
| 2,978,875 | Lackey et al. | Apr. 11, 1961 |
| 2,996,889 | Roeder | Aug. 22, 1961 |
| 3,093,135 | Hirschhorn | June 11, 1963 |

FOREIGN PATENTS

| | | |
|---|---|---|
| 4,141 | Australia | Oct. 6, 1927 |
| 798,882 | Great Britain | July 30, 1958 |
| 832,422 | Great Britain | Apr. 13, 1960 |
| 844,652 | Great Britain | Aug. 17, 1960 |

UNITED STATES PATENT OFFICE
CERTIFICATE OF CORRECTION

Patent No. 3,137,184  June 16, 1964

Peter G. Meyers

It is hereby certified that error appears in the above numbered patent requiring correction and that the said Letters Patent should read as corrected below.

Column 2, line 67, strike out "the"; column 3, line 28, for "of" read -- or --; same line 28, for "or" read -- of --; column 5, line 32, after "die" insert a comma; column 6, line 28, after "junctions" insert -- enveloping said first device with said cold junctions --.

Signed and sealed this 24th day of November 1964.

(SEAL)
Attest:

ERNEST W. SWIDER
Attesting Officer

EDWARD J. BRENNER
Commissioner of Patents